Patented June 29, 1954

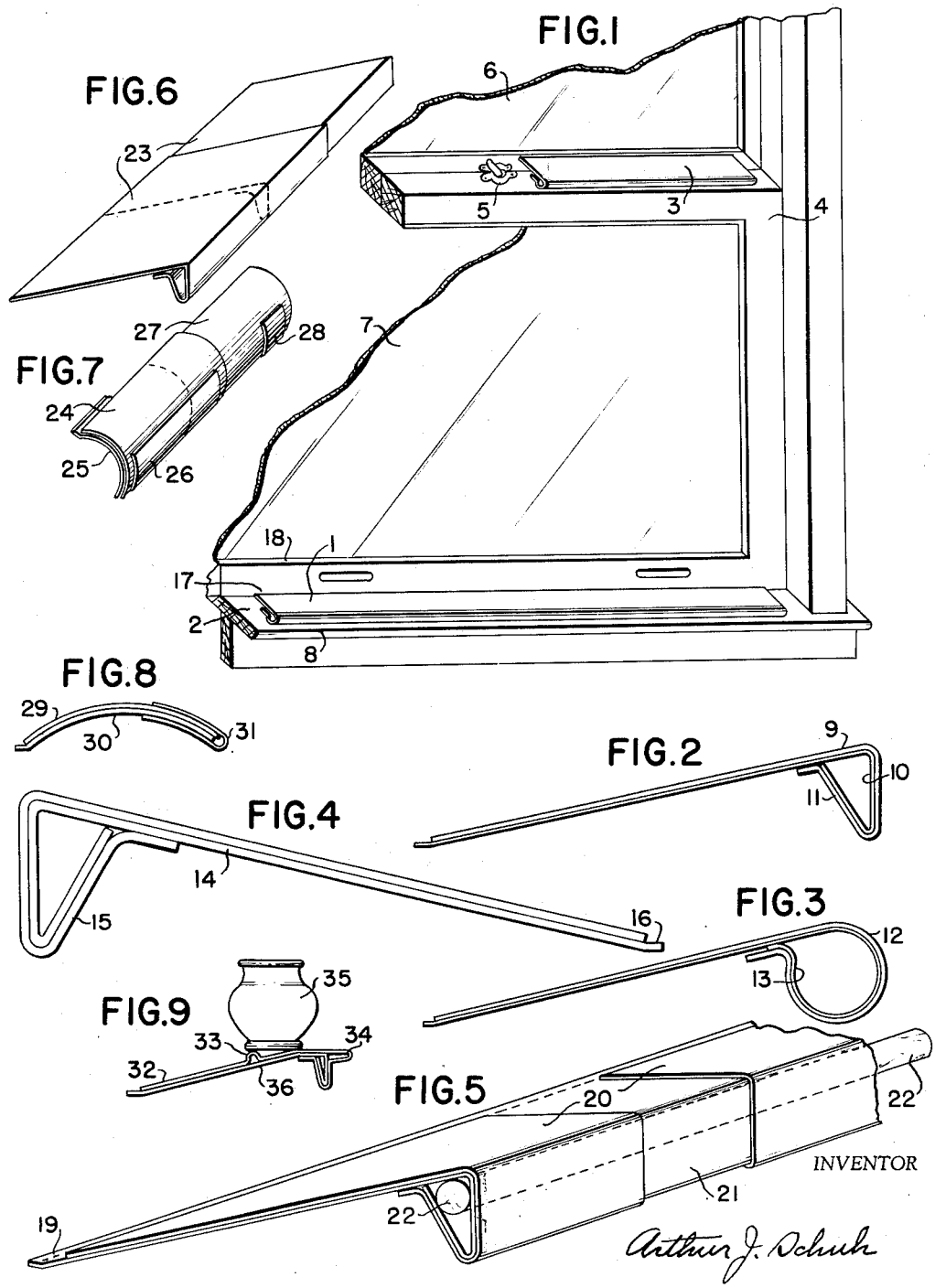

2,682,088

UNITED STATES PATENT OFFICE 2,682,088

DEVICE FOR THE ABSORPTION, RETENTION, AND THE EVAPORATION OF MOISTURE WHICH ACCUMULATES ON WINDOW SILLS

Arthur J. Schuh, Quincy, Mass.

Application August 20, 1952, Serial No. 305,348

5 Claims. (Cl. 20—11)

My invention relates to a device for the absorption, retention, and the evaporation of moisture which accumulates on a window sill.

High indoor humidity causes moisture to condense on the window panes of our homes and buildings. This condensation of moisture is particularly noticeable during the winter months when the temperature drops below freezing and our homes and buildings are being heated.

The cold glass window pane causes the moisture to freeze on the inside or room side of the glass, because the glass does not absorb the moisture, but collects the moisture. The moisture piles up into a thick layer of frost and ice.

When the temperature rises outdoors and the warm rays of the sun melts the frost and ice to a liquid state of water on the inside of the glass window pane, the water runs down on to the window sill.

Every housewife knows that this water on the window sill will soil the curtains, draperies and wall paper, unless it is wiped up and disposed of.

The device which I have invented will absorb this water. It will retain the water in an elevated position from the window sill, thus avoiding damage to the paint and woodwork. The elevation also permits air to circulate which subsequently causes the water to evaporate, therefore disposing of the water before it causes damage.

The device when manufactured of a metal having a highly polished surface, has the added advantage of deflecting the sun's rays, thereby further protecting the surface of the window sill from deterioration.

The device which I have invented can be made of any rigid material such as metals, plastics, wood, rubber, and compositions.

The shape may vary in design to accommodate the material selected, to conform to prevalent manufacturing methods.

The device acts as a secure means of holding firmly in place a strip of moisture absorbent substance, and also of permitting the moisture absorbent substance to be changed when soiled.

The moisture absorbent substance will possess high absorption and capillary attraction qualities. The moisture absorbent substance to be of a size sufficient to extend beyond the tip, or edge of the device, at least ($\frac{1}{16}$) one sixteenth of an inch and sufficient to permit folding or bending into the elevated side, so that the moisture absorbent substance is securely locked in desired position.

In the accompanying drawing illustrating the features of the invention:

Figure 1 is perspective view illustrating a window sash of commercial design embodying the present invention;

Figure 2 is an end view of the device showing the moisture absorbent substance held in position by using angles in the design and construction of the device;

Figure 3 is a similar end view as Figure 2, showing the moisture absorbent substance held in position by using curves in the design and construction of the device;

Figure 4 is an end view of the device, designed for angle construction, and showing the moisture absorbent substance held in position;

Figure 5 is a view in perspective with exaggerated end view, showing the device made in two sections to permit expansion in length without resorting to the use of a telescope method, Figure 6 is a view in perspective showing the device constructed in two sections, telescoped, in order to permit expansion, or spreading out the length to fit into a desired space;

Figure 7 is a view in perspective showing the device, constructed in a curved design and forming a bridge and in two sections, telescoped, in order to permit expanding or spreading out the length to fit a desired space and with a holding clamp at each end. This holding clamp holds the moisture absorbent substance fast, in a curved position.

Figure 8 is an end view of the device constructed in a curve to form a bridge as in Figure 7, and showing the relative position of a rigid retainer, and a moisture absorbent substance, held firmly in a curved position with clamp.

Figure 9 is an end view of the device, showing a deformation protruding from the top side, forming a ridge. The top of the ridge is on a level with the high edge. This ridge provides a wide level platform on which flower pots and other objects may be placed, without tilting. With holes placed at intervals along the draining edge of the ridge, moisture which accumulates on the surface will drain through the holes, and on to the moisture absorbent substance underneath.

Referring to Figure 1, my invention or device 1, is shown by a perspective view drawing, in place on a window sill 2, also, a smaller size 3, in place on top of the lower window frame 4, and next to the window lock 5. The glass or window panes 6 and 7, on the room side, is where the moisture collects and is frozen by the cold temperature on the outside of the building. The window sill 2 is where the water collects when ice is melted. This water runs over the edge 8 of the window sill, and at which point it comes in contact with the curtains and draperies, or runs down on to the wall paper below the window sill and finally on to the floor of the room. Fastidious housewives have been annoyed almost to exasperation, when a sudden change of temperature takes place, particularly in a large house with many windows on several floors. For preventing the difficulties enumerated above, according to the present invention, a moisture absorbing and evaporating device is provided which is particularly well fitted for the purpose intended and which is applicable to the window sill 2 merely by laying it thereon. Referring to the drawings the device comprises a rigid retainer 9 to which a strip 10 of moisture absorbent substance is secured with one edge rended active through its projection protruding beyond the adjacent edge of the retainer. In laying the device on a window sill the projecting edge of the absorbent strip beyond the retainer rests in the crevice between the lower window frame 4 and the sill 2 but the remainder of the strip is held out of contact with the sill, so that the major part of the sill does not become defaced by moisture.

To hold the absorbent strip out of contact with the window sill 2, except for the part along the projecting edge, the retainer is relatively flat along its middle area with a straight edge adjacent to the projecting edge of the absorbent strip but along the edge of the retainer opposite to the projecting edge the retainer has a deformation running its full length. The deformation is of uniform cross-section and extends transversely from the plane of the strip to form a support within which the strip is enclosed and secured, the retainer being bent back on itself and the strip being confined within the bent back portion.

In applying the device to the window sill the edge of the retainer edge nearest the projecting edge of the absorbent strip rests on the strip itself but the deformation in the retainer along its opposite strip enclosed edge raises up the mid-area of the retainer from the window sill to provide a bridge between the projecting edge of the absorbent strip and the deformation. The absorbent strip is thus held in spaced relation from the window sill except for its projecting edge, so that effective ventilation is provided beneath the absorbent strip.

The deformation in the retainer may be of various shapes to suit the conditions, it may be circular, rounded or with a curved arch merging with the mid-area of the retainer. The ends of the deformation are left open to provide enhanced ventilation in the enclosure formed by the deformation, so that the moisture absorbed by the strip is readily evaporated by circulating air. The shape of the deformation in the enclosure is such that its enclosure forms convenient means whereby it may be brought into effective gripping relation with the enclosed edge of the absorbent strip to prevent displacement from the retainer. In other respects the retainer is shaped in the manner described hereinafter.

Referring to Figure 2, the cross section view of the device 9 shows the moisture absorbent strip 10, held firmly in place by using angles 11, in the construction and design of the device. Certain materials from which the device can be made, by machine, may be produced more economically, out of flat stock, when angles are used, while others may have greater adaptability to the use of curves 12, such as shown in an end view in Figure 3, and the moisture absorbent material 13, curled into a locked position.

Referring to Figure 3, is a cross section view of the device 12 showing the moisture absorbent substance 13, curled into a locked position.

Referring to Figure 4, this end view is drawn larger to show clearly the moisture absorbent substance 14, held firmly in the device, of angle design 15, with one side or edge 16, of the moisture absorbent substance protruding beyond the edge of the device. When this protruding edge of the moisture absorbent substance is placed so it touches the frame of the window 17, Fig. 1, the moisture absorbent substance sucks up the moisture as it comes down the side of the window frame 18.

Referring to Figure 5, this view in perspective with an exaggerated end view, is drawn to make clear the moisture absorbent substance 19, extending beyond the device, and as shown in Figure 4, 16. Also showing two small sections of the device 20, and the moisture absorbent substance rigidly held in place by the use of a dowel, this permits extension of the device without employing the principle of telescoping the two sections as in Figure 6. The advantages of this type of construction are: A. Increasing the length of the device at will. B. The dowel holds both units firmly in place. C. The moisture absorbent substance between the two sections may be cut and fitted more readily than the device itself; therefore obstructions such as the window lock may be accommodated by cutting the moisture absorbent substance with household scissors. The dowel 22 can be made the same shape as the space it will occupy, thus giving greater rigidity. Also the drawing shows the ease with which the moisture absorbent substance may be removed when soiled and new inserted.

Referring to Figure 6, drawn in perspective this view shows two short sections 23, of the device scoping one within the other, thus, permitting lengthening the device at will.

Referring to Figure 7, this view drawn in perspective shows the device 24, constructed to form a curved arch. The moisture absorbent substance 25, is held in a curved position with a clamp 26. Because this shape of the device lends itself readily to the telescoping principle, or extending one end to make the device longer at will, the drawing also shows a second section 27, under the first section 24, with a clamp 26, holding together at one end, the device 24, the moisture absorbent substance 25, and the second section of the device 27. At the opposite end the second section of the device 27 and the moisture absorbent substance is held together in a curved or arched position by a second and smaller clamp 28. This type of construction permits a lighter weight material to be used.

Referring to Figure 8, this end view of the device 29, which is constructed to form a curved arch, as shown in Figure 7, shows the device 29, the moisture absorbent substance 30, and a clamp 31, in position.

Referring to Figure 9, this end view shows the device 32, with a protruding ridge 33, and a platform 34, on which a flower pot 35, stands without tilting. Holes punched along the drain side of the protruding ridge 33, will permit the moisture to come in contact with the moisture absorbent substance 36, which is directly underneath the holes.

The nature and scope of the invention having been indicated, and the construction embodying the several features of the invention having been specifically described, what I claim and desire to secure by Letters Patent is:

1. A window sill guard having a strip of moisture absorbent substance of a length to cover the sill, a rigid retainer to which the absorbent strip is secured with one edge of the strip projecting beyond the retainer, and a deformation at one edge of the retainer extending transversely from the absorbent strip to form a support for securing the strip at a distance from its projecting edge, the retainer resting on the projecting edge of the strip and the deformation to provide a bridge between the projecting edge of the strip and the deformation.

2. A window sill guard having a strip of moisture absorbent substance of a length to cover the sill, a rigid retainer to which the absorbent strip is secured with one edge of the strip projecting beyond the retainer, a deformation at one edge of the retainer extending transversely from the absorbent strip to form a support for securing the strip at a distance from its projecting edge, the retainer resting on the projecting edge of the strip, and the deformation to provide a bridge between the projecting edge of the strip and the deformation and the deformation extending lengthwise of the retainer in the form of an enclosure within which the edge of the strip opposite its projecting edge is coiled.

3. A window sill guard having a strip of moisture absorbent substance of a length to cover the sill, a rigid retainer to which the absorbent strip is secured with one edge of the strip projecting beyond the retainer, a deformation at one edge of the retainer extending transversely from the absorbent strip to form a support for securing the strip at a distance from its projecting edge, the retainer resting on the projecting edge of the strip and the deformation to provide a bridge between the projecting edge of the strip, and the deformation and the deformation extending lengthwise of the retainer in the form an an enclosure within which the edge of the strip opposite its projection edge is coiled the end of the enclosure being left open to provide ventilation in the enclosure for moisture absorbed by the strip.

4. A window sill guard having a strip of moisture absorbent substance of a length to cover the sill, a rigid retainer to which the absorbent strip is secured with one edge of the strip projecting beyond the retainer, a cylindrically curved deformation at one edge of the retainer extending transversely from the absorbent strip to form a support for securing the strip at a distance from its projecting edge, the retainer resting on the projecting edge of the strip, and the deformation to provide a bridge between the projecting edge of the strip, and the deformation, and the deformation extending lengthwise of the retainer in the form of an enclosure within which the edge of the strip opposite its projection edge is coiled, with the ends of the enclosure left open to provide ventilation in the enclosure for moisture absorbed by the strip and with an edge of the retainer brought into gripping relation with the strip to prevent displacement of the strip from the retainer.

5. A window sill guard having a strip of moisture absorbent substance of a length to cover the sill, a rigid retainer to which the absorbent strip is secured with one edge of the strip projecting beyond the retainer, a double angularly bent deformation at one edge of the retainer extending transversely from the absorbent strip to form a support for the strip at a distance from its projecting edge, the retainer resting on the projecting edge of the strip and the deformation to provide a bridge between the projecting edge of the strip and the deformation, and a second deformation extending from the retainer at the opposite side of the strip from the first mentioned deformation forming a surface level with the upper surface of the retainer to provide a non-inclined base for flower pots and miscellaneous objects.

References Cited in the file of this patent

UNITED STATES PATENTS

| Number | Name | Date |
|---|---|---|
| 396,327 | Crane | Jan. 15, 1889 |
| 741,457 | Carl | Oct. 13, 1903 |
| 1,722,172 | Benson | July 23, 1929 |
| 2,120,171 | Bialy | June 7, 1938 |
| 2,570,336 | Fouts | Oct. 9, 1951 |
| 2,581,727 | Soplata | Jan. 8, 1952 |

FOREIGN PATENTS

| Number | Country | Date |
|---|---|---|
| 5,290 | Germany | May 15, 1879 |
| 23,147 | Great Britain | Nov. 3, 1898 |